May 10, 1927.

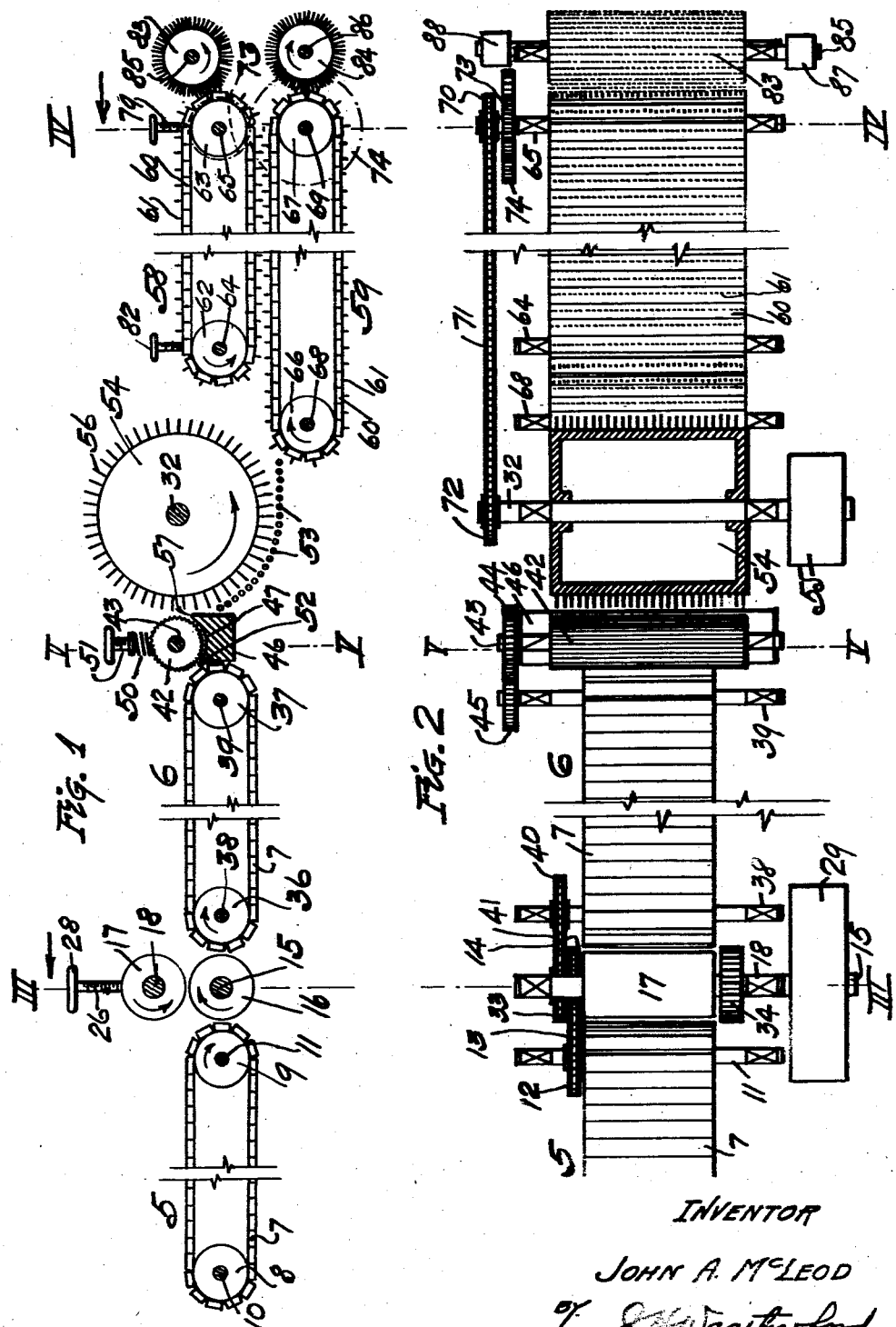

J. A. McLEOD 1,627,919

MEANS AND METHOD FOR SCUTCHING FIBROUS PLANTS

Filed Feb. 25, 1926   3 Sheets-Sheet 2

INVENTOR
JOHN A. McLEOD
BY J. H. Weatherford
ATTORNEY.

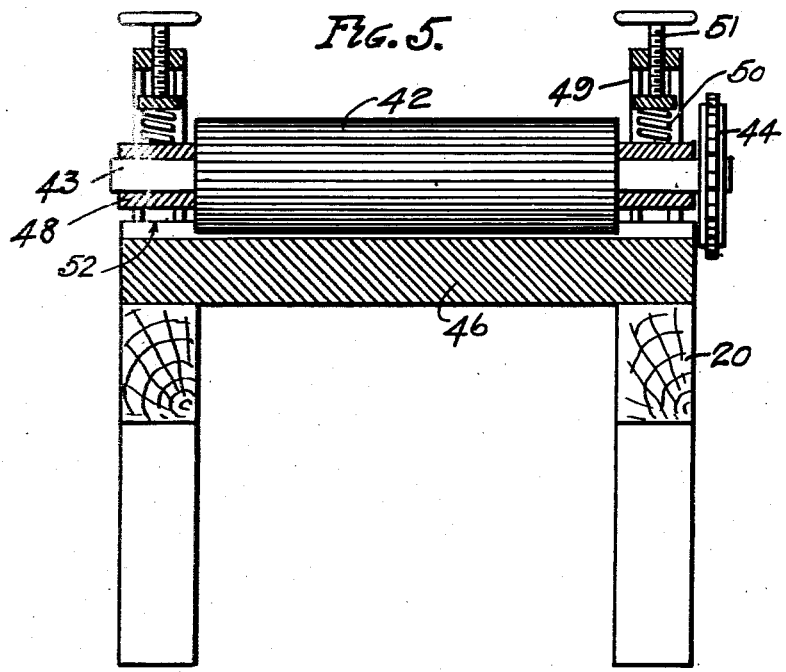
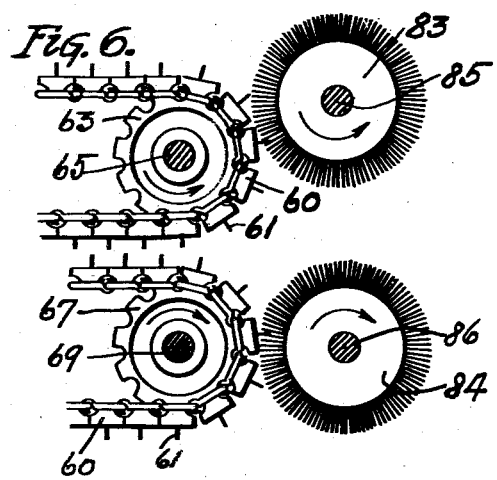

Patented May 10, 1927.

1,627,919

UNITED STATES PATENT OFFICE.

JOHN A. McLEOD, OF MEMPHIS, TENNESSEE.

MEANS AND METHOD FOR SCUTCHING FIBROUS PLANTS.

Application filed February 25, 1926. Serial No. 90,520.

This invention has general reference to means and methods by which the fibrous portions of plants, grasses, and the like, may be scutched or swingled without the necessity of preliminary retting or macerating; but relates more particularly to such means and methods which are especially adapted for the removal, in condition for commercial use, of the fiber that is present in the plant which is variously known as "yucca grass", "bear grass", and "Spanish bayonet".

The principal objects of the invention are to improve upon the scutching means and methods known heretofore, by providing means and a method by which the scutching of the plants may be performed while they are in the green condition in which they are pulled or otherwise gathered, without any preliminary retting or macerating, or other treatment; and by which the plants may, by successive steps, preferably in a continuous series of operations, be crushed; then scutched or swingled, to remove the bast or phloëm and any remaining parenchyma; then combed or carded, to straighten the fibres and still further clean them; and finally subjected to an operation to separate the longer fibres from the shorter ones.

The means by which the foregoing and other objects are accomplished by my invention, and the manner of their accomplishment, readily will be understood from the following description on reference to the accompanying drawings, in which—

Fig. 1 is a side elevation of the various parts of the apparatus, with non-essential frame and bearing members omitted in order to simplify the drawing.

Fig. 2 is a plan, on the same scale, with the same bearings and frame members omitted, and with the main scutching drum shown in section.

Fig. 5 is a similar view, taken substantially on line V—V of Figs. 1 and 2.

Fig. 6 is a fragmentary sectional elevation, taken substantially on line VI—VI of Fig. 4.

Figure 3:
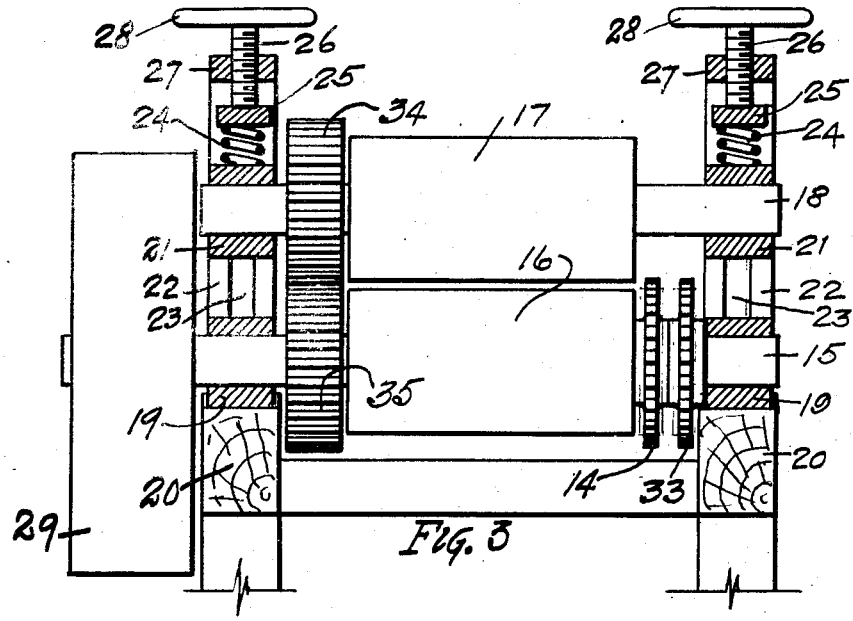
Fig. 3 is a sectional elevation, on a larger scale, taken substantially on line III—III of Figs. 1 and 2, with bearings and frame members shown.

As shown in the drawings, 5 and 6 are conveyors, each having a belt made up of a series of slats 7, hingedly joined together in any suitable manner, as by the sprocket chains shown in Fig. 6. The belt of conveyor 5 passes over pulleys 8 and 9, mounted on and secured to shafts 10 and 11 respectively, which shafts are journalled in suitable bearings (not shown). Pulley 9 is driven by a sprocket wheel 12 and a sprocket chain 13, from a sprocket wheel 14, mounted on the shaft 15. These sprocket wheels and the chain are shown in Fig. 2, but purposely are omitted in Fig. 1. Mounted on the shaft 15, and suitably secured thereto, is a drum 16, which co-operates with a similar drum 17, mounted on a shaft 18, to constitute crushing rolls.

On reference to Fig. 3, it will be seen that the shaft 15 is supported in fixed bearings 19 carried by the frame members 20, and that the shaft 18 is mounted in adjustable bearings 21, which are vertically movable in guides 22 that rest upon and extend upward from the frame members 20. 23 are vertical slots in the guides 22, in which suitable lugs (not shown, but intended to extend laterally from the bearings 21) are slidable. Said bearings are pressed downward by compression springs 24, placed between the tops of the bearings and the under sides of blocks 25. 26 are adjusting screws which are carried by cross members 27 of the guides. 28 are hand wheels by which said screws may be adjusted vertically, to put the desired compression on the springs 24. The lower roller 16 has its shaft provided with a belt pulley 29, which is driven by a belt (not shown) from a suitable source of power. The lower shaft 15 carries the sprocket wheel 14, before mentioned, and a second sprocket wheel 33, which will be further referred to hereinafter. 34 and 35 are co-operating gears, mounted on and secured to the shafts 18 and 15 respectively, by which gears the driving power is transmitted to the roller 17. These gears are provided with extra-long teeth, so that minor adjustment of the rollers toward or away from each other will not affect the drive. If, however, any object which passes between the rollers serves to compress the springs 24 excessively, and separate the gears sufficiently to throw them out of mesh, and the gears fail to re-mesh after such object passes the rollers, they will almost immediately re-engage, due to movement of the driving gear relative to the driven one.

Referring again to Figs. 1 and 2, the belt of the conveyor 6 is carried by pulleys 36 and 37, which are supported upon and secured to shafts 38 and 39 respectively, journalled in suitable bearings (not shown). 40 is a sprocket wheel, mounted on and secured to shaft 38, which sprocket wheel is driven by a sprocket chain 41 from the sprocket wheel 33, before mentioned.

42 is a longitudinally-corrugated feeding and holding roller, which is mounted on and secured to a shaft 43, journalled in suitable bearings (shown in Fig. 5 only). Secured to the shaft 43, is a gear 44, which meshes with and is driven by a gear 45, carried by the shaft 39. 46 is what may be termed a feed block, having a curved upper surface 47, concentric with the drum 42 and normally being barely out of contact therewith. The ends of said block are supported by the frame members 20. Shaft 43 is journalled in bearings 48, which are vertically movable in guides 49, extending upward from the frame members 20, said bearings being pressed downward by compression springs 50, the compression of which may be regulated by adjusting-screws 51.

Figure 4:
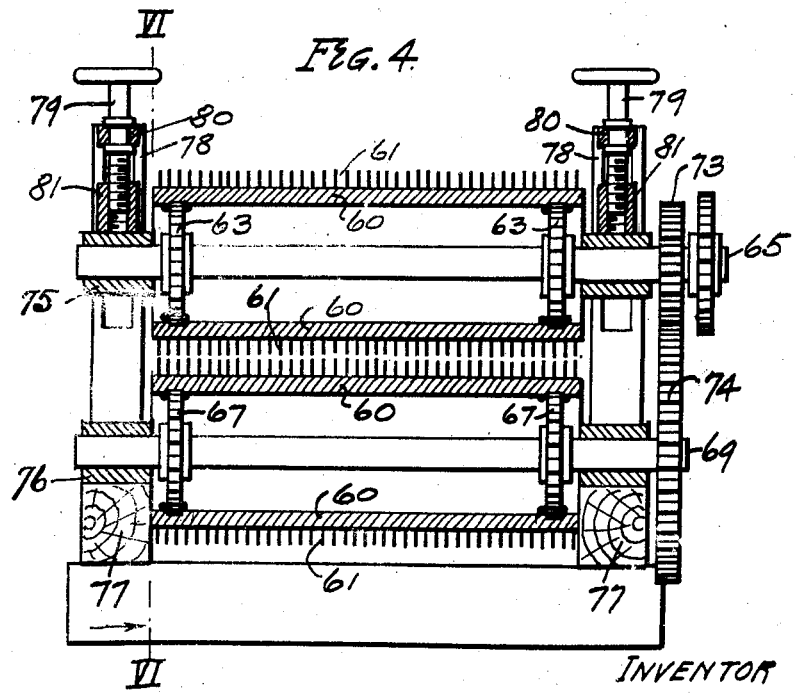
Fig. 4 is a similar view, taken substantially on line IV—IV of Figs. 1 and 2.

The edge 52 of the block 46 lies in close proximity to the conveyor slats 7, and constitutes a stripping edge for the conveyor 6. Adjacent and parallel to the opposite side of said block, bars 53 extend from side to side of the machine, the series of bars being symmetrically spaced apart to the desired extent, and being disposed in an arc concentric with the periphery of a drum 54, which is mounted on and secured to the shaft 32 referred to heretofore, said shaft being mounted in suitable bearings (not shown). 55 is a driving pulley, which is also mounted on and secured to the shaft 32, said pulley serving as a means for driving the drum 54 from a suitable source of power. Said drum is provided with radially-extending spikes 56, which preferably have sharp points, and the free ends of which just clear the rounded edge 57 of the feed block 46, also passing in close proximity to the arcuate series of bars 53. 58 and 59, respectively, are conveyors, each of which has a belt made up of a plurality of similar slats 60, hingedly connected in any desired or preferred manner, but preferably carried by sprocket chains, as shown in Fig. 6. 61 are hackling pins extending outward from the slats 60. The chains of conveyor 58 pass over sprocket wheels 62 and 63, which are mounted on and secured to shafts 64 and 65 respectively, these shafts being journalled in suitable bearings, of which those for shaft 64 are not shown, but those for shaft 65 are shown in Fig. 4. Similarly, the chains for conveyor 59 pass over sprocket wheels 66 and 67 respectively, which are mounted on and secured to shafts 68 and 69 respectively, mounted in suitable bearings, of which those for shaft 68 are not shown, but those for shaft 69 are shown in Fig. 4. Shaft 65 carries a sprocket wheel 70, which is driven by a link belt 71 from the sprocket wheel 72, secured upon the shaft 32. Also mounted on shaft 65, is a gear wheel 73, which meshes with and drives a spur gear 74 on the shaft 69, only the pitch circles of these gears being shown in Fig. 1.

Referring now to Fig. 4, it will be seen that the gear 73 has a diameter approximately one-half that of gear 74, so that the sprocket wheel 63 will be driven at approximately twice the speed of the sprocket wheel 67, and therefore the adjacent portions of the belts of the conveyors 58 and 59 will be driven in the same direction, with a speed ratio of approximately two to one, and an effectual combing or hackling action will be produced by the resulting movement of the pins 61 on the two belts, relative to each other. The shafts 65 and 69 are journalled in bearings 75 and 76 respectively, the bearings 76 being secured to the frame members 77, while the bearings 75 are slidably mounted in guides 78, extending upward from the frame members 77, and may be vertically adjusted by means of screws 79, mounted in cross members 80 of the guides 78, and co-operating with nuts 81 integral with the bearings 75. By this adjustment, the spacing apart of the belts may be regulated as may be desired. As shown in Fig. 1, screws 82 provide for similar adjustment of the shaft 64, carrying the rear end of the belt 58.

83 and 84 are cylindrical brushes, preferably having bristles of steel wire, which brushes are mounted on shafts 85 and 86 respectively, and preferably are driven by belt pulleys 87 and 88 respectively, from any suitable source of power.

From the foregoing, it will be seen that the speeds of the various parts may be regulated independently, so that the rolls 16 and 17, and the adjacent conveyors, may move at a comparatively slow speed, while the peripheral speed of the drum 54 may be much greater than that of said rolls, and than the speed of travel of the belts of said conveyors. Also, the brushes 83 and 84 may be rotated at such speed as may be desired, or as may be necessary to effect the removal of the fibers from the hackling belts 58 and 59, and to separate the longer fibers from the shorter ones by centrifugal action.

As stated hereinbefore, my improved means and method are especially adapted for removing the fibrous material from "bear grass" and other plants of the yucca family, and particularly from the blades or leaves of such plants. The reason for this is that, as is well known, the parenchyma of these plants is distinctly saponaceous, instead of being gummy or resinous, and scutching and decortication of the leaves is greatly facilitated, particularly when performed by the means and method described herein, due to the presence of the slimy saponaceous matter in their cores, the amount of such matter being so great in some species of these plants that the leaves, and sometimes the ground or crushed roots, are used as a substitute for soap. The green leaves, just as they are cut or otherwise gathered, are placed upon conveyor 5, preferably longitudinally thereof, with their pointed or smaller ends directed toward the crushing rolls 16 and 17, to which they are delivered by said conveyor. The crushing action of the rolls not only removes the greater part of the free moisture and the thin saponaceous matter from the leaves, permitting them to drip or flow downward and be wasted away from below roller 16, but also brings the saponaceous matter into contact with all parts of the mass, thereby tending to loosen, or to facilitate subsequent loosening of, the fibres from the woody portions of the core and from the sheath or outer covering of the leaf.

From rolls 16 and 17 the crushed mass is discharged upon conveyor 6, by which it is delivered to the point where it is engaged by the corrugated roller 42, and fed thereby between said roller and the feed block 46, the peripheral speed of said roller being substantially the same as that of the crushing rolls, and conforming with the rate of travel of the conveyors 5 and 6, so that any tendency of the material to accumulate on the conveyors, or to clog or "crowd" said rolls or said roller, is avoided. As the material is advanced by roller 42 over the rounded edge 57 of the feed block 46, it is engaged by the spikes or pins 56 of the drum 54, and, since the peripheral speed of said drum is much greater than that of said roller, and since, due to that fact and the bending of the fibres downward over the rounded edge 57, said roller opposes movement of the material as rapidly as it would otherwise be advanced by said drum, said spikes or pins exercise a whipping, swingling or scutching action upon the mass, while at the same time drawing it forward and over the spaced bars 53. This results in partly straightening out the fibres, and beating out the woody portions of the core, the pieces of the sheath or outer covering of the leaves, and any dirt or other foreign matter that may be present, all of which pass between the bars 53 and are wasted away. The fibres are delivered upon the lower one of the hackling belts 60, and advanced by it between the two belts, and, since the upper one of said belts travels at approximately twice the speed of the lower one, the fibres are combed or hackled by the pins 61 on the two belts, thereby being further straightened out and separated, and freed from foreign matter. Also, during the swingling and drawing of the fibres over the bars 53, by the drum 54, and their subsequent combing by the hackling belts, they are further freed from moisture and parenchyma.

The fibres are removed from the hackling belts by the revolving brushes 83 and 84, and thrown forward into storage piles or some form of receptacles, the peripheral speed of said brushes preferably being sufficient to separate the longer fibres from the shorter ones, and from any remaining foreign matter by projecting the longer fibres centrifugally a greater distance than the shorter ones or the foreign matter.

It is to be understood that, while the foregoing description refers to the removal of fibre from the blades or leaves of yucca plants, such reference is for purposes of illustration only, it being manifest that the same or similar means and method are adapted for the separation of fibre from various other forms of plant life. Also, while the means and method described herein are intended primarily for utilization with fibrous material that has not been preliminarily retted, macerated, or otherwise treated, such means and method are likewise adapted to be utilized for the removal of fibre from materials that have been subjected to some form of initial treatment.

Various modifications of minor details of the invention disclosed herein doubtless readily will suggest themselves to those skilled in the art to which it appertains, and I therefore disclaim any intention to limit myself to any of the details which I have shown and described herein for illustrative purposes only.

Having now fully disclosed the invention, what is claimed is:

1. In apparatus of the character described, the combination of crushing means, means for delivering material thereto in predetermined arrangement, scutching means at a distance from said crushing means, means adjacent said scutching means, for regulating the delivery of material from said crushing means to said scutching means, and hackling means receiving material from said scutching means.

2. In apparatus of the character described, the combination of crushing means, means for delivering material thereto in substantially unchanged initial arrangement, scutching means at a distance from said crushing means, means for delivering material from said crushing means to said scutching means, means adjacent said scutching means, for regulating the rate of delivery of material thereto, and hackling means comprising means for receiving material from said scutching means and delivering it at a distance therefrom.

3. In apparatus of the character described, the combination of crushing means, means for delivering material thereto, scutching means, means for delivering material from said crushing means to said scutching means, hackling means comprising traveling pins and receiving material from said scutching means, and means engaging said pins and detaching said material therefrom and from said hackling means.

4. In apparatus of the character described, the combination of crushing means, means for delivering material thereto, scutching means, means for delivering material from said crushing means to said scutching means, hackling means comprising traveling pins and receiving material from said scutching means, and means engaging said pins, detaching said material therefrom and from said hackling means, and discharging it at a distance from said hackling means.

5. In apparatus of the character described, the combination of crushing means, means for delivering material thereto, scutching means, means for transferring material from said crushing means to said scutching means, hackling means comprising traveling pins and receiving material from said scutching means, and means engaging said pins, detaching said material therefrom and from said hackling means, and separating it by centrifugal action.

6. In apparatus of the character described, the combination of compressing means, combined scutching and material-advancing means, means for transferring material from said compressing means to said combined means, and feed-regulating means interposed between said compressing means and said combined means, adjacent the latter, whereby initial advancement of material by said combined means is opposed.

7. In apparatus of the character described, the combination of compressing means, combined scutching and material-advancing means comprising a rotatable member carrying spikes, and feed-regulating means between said compressing means and said combined means, comprising a guiding member a portion of which is adjacent to and directed toward said combined means, whereby material is deflected from said guiding member by said spikes.

8. In apparatus of the character described, the combination of compressing means, combined scutching and material-advancing means comprising a rotatable member carrying spikes, feed-regulating means between said compressing means and said combined means, comprising a guiding member a portion of which is adjacent to and directed toward said combined means, whereby material is deflected from said guiding member by said spikes, and a rotatable member adjustably co-operable with said guiding member for advancing material toward said combined means.

In testimony of the foregoing, I affix my signature.

JOHN A. McLEOD.